(12) United States Patent
Pechstein et al.

(10) Patent No.: US 12,390,870 B2
(45) Date of Patent: Aug. 19, 2025

(54) LUBRICATION SYSTEM FOR PORTABLE PIPE THREADER

(71) Applicant: MILWAUKEE ELECTRIC TOOL CORPORATION, Brookfield, WI (US)

(72) Inventors: Joseph J. Pechstein, West Bend, WI (US); Sean T. Kehoe, Hartland, WI (US); Aaron Grode, Brookfield, WI (US); Timothy Hilger, Waterford, WI (US); Joseph C. Illg, Grafton, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 482 days.

(21) Appl. No.: 17/888,873

(22) Filed: Aug. 16, 2022

(65) Prior Publication Data
US 2022/0388084 A1 Dec. 8, 2022

Related U.S. Application Data

(63) Continuation-in-part of application No. 17/710,108, filed on Mar. 31, 2022.
(Continued)

(51) Int. Cl.
*B23G 1/24* (2006.01)
*B23G 1/52* (2006.01)
*B23Q 11/10* (2006.01)

(52) U.S. Cl.
CPC .............. *B23G 1/24* (2013.01); *B23G 1/52* (2013.01); *B23G 2240/12* (2013.01);
(Continued)

(58) Field of Classification Search
CPC . B23G 1/22; B23G 1/225; B23G 1/24; B23G 1/44; B23G 1/52; B23G 2240/08;
(Continued)

(56) References Cited

U.S. PATENT DOCUMENTS 1,527,185 A 2/1925 Hall
1,672,583 A * 6/1928 Travers .............. B01D 17/0211
210/801
(Continued)

FOREIGN PATENT DOCUMENTS

CN 101704141 A 5/2010
CN 101758305 A 6/2010
(Continued)

OTHER PUBLICATIONS

Ridgid Tools, "Model 535A Automatic Threading Machine," <https://www.ridgid.com/us/en/535a-automatic-threading-machine> web page publicly available at least as early as Nov. 1, 2020.
(Continued)

*Primary Examiner* — Sunil K Singh
*Assistant Examiner* — Michael Vitale
(74) *Attorney, Agent, or Firm* — Michael Best & Friedrich LLP

(57) ABSTRACT

A portable pipe threader includes a housing, a carriage, and at least one pipe threading tool. A drive assembly of the is at least partially positioned within the housing and includes an electric motor operable to provide torque to the pipe. A lubrication system is removably coupled to the housing and includes a reservoir for holding a lubricant and a pump powered by the drive assembly. A stand of the portable pipe threader is adjustable between collapsed and deployed states. When collapsed, a longitudinal axis of the housing is maintained at a first oblique angle relative to a horizontal reference plane parallel with a work surface upon which the stand is supported to funnel lubricant toward the reservoir. When deployed, the longitudinal axis is maintained at a second oblique angle to funnel lubricant away from an end of the pipe on which a working operation is performed.

17 Claims, 15 Drawing Sheets

Related U.S. Application Data

(60) Provisional application No. 63/218,653, filed on Jul. 6, 2021, provisional application No. 63/168,741, filed on Mar. 31, 2021.

(52) U.S. Cl.
CPC ...... *B23G 2240/40* (2013.01); *B23Q 11/1092* (2013.01); *Y10T 29/5114* (2015.01)

(58) Field of Classification Search
CPC ............ B23G 2240/12; B23G 2240/40; Y10T 29/5114; Y10T 82/22; Y10T 408/65; B23Q 11/10–148; B23Q 11/1092
USPC .......... 470/66–83; 408/124; 220/563; 82/113
See application file for complete search history.

(56) References Cited

U.S. PATENT DOCUMENTS

| | | |
|---|---|---|
| 1,831,957 A | 11/1931 | Harrison |
| 1,956,182 A | 4/1934 | Thewes |
| 1,966,124 A | 7/1934 | Kimlin et al. |
| 1,973,231 A | 9/1934 | Thewes |
| 2,004,639 A | 6/1935 | Thewes |
| 2,076,831 A | 4/1937 | Thewes |
| 2,110,099 A | 3/1938 | Thewes |
| 2,205,148 A | 6/1940 | Mayotte |
| 2,219,721 A | 10/1940 | Ingwer et al. |
| 2,242,954 A | 5/1941 | Ingwer |
| 2,255,009 A | 9/1941 | Ingwer |
| 2,304,027 A | 12/1942 | Sellmeyer |
| 2,350,313 A | 5/1944 | Ingwer et al. |
| 2,374,176 A | 4/1945 | Cook |
| 2,393,498 A * | 1/1946 | Miller .................... B01D 21/00 210/538 |
| 2,581,702 A | 1/1952 | Quijada |
| 2,591,389 A | 4/1952 | Wallace |
| 2,600,776 A | 6/1952 | Ingwer |
| 2,678,453 A | 5/1954 | Rudolph |
| 2,680,256 A | 6/1954 | Ingwer et al. |
| 2,680,861 A | 6/1954 | Ingwer et al. |
| 2,693,966 A | 11/1954 | Chasar |
| 2,745,670 A | 5/1956 | Janik |
| 2,753,575 A | 7/1956 | Ingwer |
| 2,768,550 A | 10/1956 | Ingwer et al. |
| 2,778,652 A | 1/1957 | Ingwer et al. |
| 2,891,799 A | 6/1959 | Janik |
| 2,916,749 A | 12/1959 | Ingwer et al. |
| 2,996,737 A | 8/1961 | Bjalme |
| 3,002,205 A | 10/1961 | Buyer |
| 3,009,178 A | 11/1961 | Buyer |
| 3,012,792 A | 12/1961 | Bjalme |
| 3,049,737 A | 8/1962 | Weibel |
| 3,082,445 A | 3/1963 | Buyer |
| 3,095,772 A | 7/1963 | Ingwer |
| 3,188,666 A | 6/1965 | Brown, Sr. et al. |
| 3,232,629 A | 2/1966 | Obear |
| 3,270,592 A | 9/1966 | Behnke |
| 3,316,571 A | 5/1967 | Cutrone |
| 3,371,258 A | 2/1968 | Brown |
| 3,398,966 A | 8/1968 | Chalfant et al. |
| 3,413,667 A | 12/1968 | Behnke |
| 3,427,672 A | 2/1969 | Frank |
| 3,456,956 A | 7/1969 | Herbkersman |
| 3,521,313 A | 7/1970 | Baker |
| 3,526,411 A | 9/1970 | Chalfant et al. |
| 3,562,827 A | 2/1971 | Janik |
| 3,610,640 A | 10/1971 | Bollin et al. |
| 3,631,552 A * | 1/1972 | Ivester .................... B23B 5/165 470/901 |
| 3,811,145 A | 5/1974 | Fink |
| 3,864,774 A | 2/1975 | Fohl |
| 3,995,869 A | 12/1976 | Mazingue |
| 4,002,960 A | 1/1977 | Brookfield et al. |
| 4,209,274 A | 6/1980 | Martin et al. |
| 4,213,722 A | 7/1980 | Wagner |
| 4,225,273 A | 9/1980 | Womack |
| 4,247,124 A | 1/1981 | Wagner |
| 4,275,490 A | 6/1981 | Bivins |
| 4,276,490 A | 6/1981 | Saldinger |
| 4,279,182 A | 7/1981 | Miyagawa et al. |
| 4,338,556 A | 7/1982 | Hetzel |
| 4,370,770 A | 2/1983 | Wagner |
| 4,402,423 A | 9/1983 | Skowronski et al. |
| 4,581,783 A | 4/1986 | Hayes et al. |
| 4,606,249 A | 8/1986 | Hayes et al. |
| 4,613,260 A | 9/1986 | Hayes et al. |
| 4,692,071 A | 9/1987 | Hirota |
| 4,752,163 A | 6/1988 | Fedor |
| 4,757,598 A | 7/1988 | Redman |
| 4,787,531 A | 11/1988 | Gress |
| D299,466 S | 1/1989 | Hayes et al. |
| 4,795,175 A | 1/1989 | Babb et al. |
| 4,808,047 A | 2/1989 | Calevich et al. |
| 4,811,639 A | 3/1989 | Gress et al. |
| 4,819,527 A | 4/1989 | Redman |
| 5,002,440 A | 3/1991 | Tamaoki et al. |
| 5,074,176 A | 12/1991 | Redman et al. |
| 5,076,744 A | 12/1991 | Kitagawa et al. |
| 5,087,013 A | 2/1992 | Gress et al. |
| 5,104,268 A | 4/1992 | Kitagawa et al. |
| 5,158,404 A | 10/1992 | Samas et al. |
| 5,199,928 A | 4/1993 | Gress et al. |
| 5,458,770 A * | 10/1995 | Fentz ................. B01D 17/0211 210/171 |
| 5,560,582 A | 10/1996 | Beelen |
| 5,700,140 A | 12/1997 | Gray et al. |
| 5,826,469 A | 10/1998 | Haradem |
| 5,890,852 A | 4/1999 | Gress |
| 6,439,087 B1 | 8/2002 | Haas |
| 6,471,220 B1 | 10/2002 | Babb |
| 7,854,321 B2 * | 12/2010 | Twig ..................... B25H 3/023 206/483 |
| 7,958,805 B2 | 6/2011 | Rigolone et al. |
| 8,047,923 B2 | 11/2011 | Emerson |
| 9,095,917 B2 | 8/2015 | Patil et al. |
| 9,138,818 B2 | 9/2015 | Kundracik et al. |
| 9,370,835 B2 | 6/2016 | Kundracik et al. |
| 9,796,033 B2 | 10/2017 | Kundracik et al. |
| 10,016,830 B2 | 7/2018 | Hamm et al. |
| 10,239,140 B2 | 3/2019 | Kundracik et al. |
| 10,668,548 B2 | 6/2020 | Kundracik et al. |
| 2003/0024357 A1 | 2/2003 | Hofmann et al. |
| 2007/0137934 A1 | 6/2007 | Nappier et al. |
| 2008/0210062 A1 | 9/2008 | Nitchman et al. |
| 2008/0277335 A1* | 11/2008 | Allen ................. B01D 21/0003 210/521 |
| 2009/0248188 A1 | 10/2009 | Haas et al. |
| 2011/0217196 A1 | 9/2011 | Gang |
| 2013/0055862 A1* | 3/2013 | Kundracik ............... B23G 1/24 82/113 |
| 2015/0165534 A1 | 6/2015 | Hamm |
| 2017/0100791 A1 | 4/2017 | Hamm et al. |
| 2017/0259357 A1 | 9/2017 | Choi |
| 2018/0147713 A1 | 5/2018 | Schmauder et al. |
| 2019/0006980 A1 | 1/2019 | Sheeks et al. |
| 2019/0044110 A1 | 2/2019 | Sheeks et al. |
| 2019/0143430 A1 | 5/2019 | Kundracik et al. |
| 2021/0129228 A1 | 5/2021 | Pechstein et al. |
| 2021/0229200 A1 | 7/2021 | Pechstein et al. |
| 2022/0314351 A1* | 10/2022 | Pechstein ................ B23G 1/24 |

FOREIGN PATENT DOCUMENTS

| | | |
|---|---|---|
| CN | 102513618 B | 9/2014 |
| CN | 204035722 U | 12/2014 |
| CN | 104942382 A | 9/2015 |
| CN | 204770999 U | 11/2015 |
| CN | 105171145 A | 12/2015 |
| CN | 104588792 B | 2/2017 |
| CN | 206084041 U | 4/2017 |
| CN | 107378015 A | 11/2017 |
| CN | 107511539 A | 12/2017 |

(56) References Cited

FOREIGN PATENT DOCUMENTS

| | | |
|---|---|---|
| CN | 208067512 U | 11/2018 |
| CN | 109773283 A | 5/2019 |
| CN | 209094723 U | 7/2019 |
| CN | 206509598 U | 9/2019 |
| CN | 109226911 B | 2/2020 |
| DE | 1527169 A1 | 7/1969 |
| DE | 1527175 B1 | 12/1970 |
| DE | 20016924 U1 | 12/2000 |
| EP | 0249184 B1 | 2/1993 |
| EP | 0569320 A1 | 11/1993 |
| EP | 1524058 A2 | 4/2005 |
| EP | 1907172 B1 | 5/2015 |
| EP | 2605879 B1 | 8/2019 |
| EP | 3584027 B1 | 7/2020 |
| JP | 2005161515 A | 6/2005 |
| JP | 2019048371 A | 3/2019 |
| WO | 2010018409 A2 | 2/2010 |
| WO | 2019006452 A2 | 1/2019 |

OTHER PUBLICATIONS

Teledyne Oster, "Power Threaders," Catalog No. 77, Copyright 1976 (28 pages).
Wheeler Mfg., "Universal Dies/Die Heads are suited for in-place threading," <https://news.thomasnet.com/fullstory/universal-dies-die-heads-are-suited-for-in-place-threading-29007> press release dated Dec. 12, 2003.
International Search Report and Written Opinion for Application No. PCT/US2022/022805 dated Jul. 22, 2022 (10 pages).

* cited by examiner

LUBRICATION SYSTEM FOR PORTABLE PIPE THREADER

CROSS-REFERENCE TO RELATED APPLICATIONS

This application is a continuation-in-part of co-pending U.S. patent application Ser. No. 17/710,108 filed on Mar. 31, 2022, which claims priority to U.S. Provisional Patent Application No. 63/218,653 filed on Jul. 6, 2021, and U.S. Provisional Patent Application No. 63/168,741 filed on Mar. 31, 2021, the entire contents of all of which are incorporated herein by reference.

FIELD OF THE INVENTION

The present invention relates to pipe threaders, and more particularly to lubrication systems for portable pipe threaders.

BACKGROUND OF THE INVENTION

Portable pipe threaders include a stand and a carriage mounted to the stand having multiple pipe threading tools. These tools are usually a die holder including a die, a pipe cutter, and a pipe reamer. Typically, a motor transmits torque to a chuck. A pipe is clamped within the chuck and as the motor rotates the chuck, the pipe rotates with respect to the tools. The motor is an AC motor that receives power from a remote power source (e.g., via a power cord) and is usually controlled using a pedal, which upon actuation, triggers the motor to begin rotating the chuck and the pipe therein to cut the pipe, thread the pipe, etc. During threading operations, the thread-cutting dies, or other pipe threading tools, require lubrication to minimize friction and prevent excessive heat on the pipe and the tool. Some portable pipe threaders have an onboard lubrication system to lubricate the dies as the threads are being cut on the pipe, while others rely upon the operator to manually lubricate the dies with a hand-operated pump.

SUMMARY OF THE INVENTION

The present invention provides, in one aspect, a portable pipe threader including a housing, a carriage supported by the housing, and at least one pipe threading tool coupled to the carriage and selectively operable to perform work on a pipe. A drive assembly of the portable pipe threader is at least partially positioned within the housing, the drive assembly including an electric motor operable to provide torque to the pipe. A lubrication system of the pipe threader is removably coupled to the housing, the lubrication system including a reservoir for holding a lubricant and a pump powered by the drive assembly. A stand of the portable pipe threader is adjustable between a collapsed state and a deployed state. In the collapsed state, a longitudinal axis of the housing is maintained at a first oblique angle relative to a horizontal reference plane parallel with a work surface upon which the stand is supported to funnel lubricant toward the reservoir. In the deployed state, the longitudinal axis of the housing is maintained at a second oblique angle relative to the horizontal reference plane parallel with the work surface upon which the stand is supported to funnel lubricant away from an end of the pipe on which a working operation is performed.

The present invention provides, in another aspect, a portable pipe threader including a housing, a carriage supported by the housing, and at least one pipe threading tool coupled to the carriage and selectively operable to perform work on a pipe. A drive assembly is at least partially positioned within the housing, the drive assembly including an electric motor operable to provide torque to the pipe. A lubrication system includes a catch basin provided on one side of the housing, a reservoir for holding a lubricant, a debris shield positioned to shield the reservoir from debris, a drip catch having one or more pockets that open toward the debris shield, and a pump powered by the drive assembly to establish a flow of lubricant from the reservoir. A stand is adjustable between a collapsed state and a deployed state. With the stand in the collapsed state, the portable pipe threader can be put in a vertically stowed configuration in which a longitudinal axis of the housing is substantially vertical with respect to a floor or ground surface. In the vertically stowed configuration, the debris shield is oriented substantially vertically above the drip catch so that the drip catch pockets can catch and retain lubricant dripped from a proximal edge of the debris shield.

The present invention provides, in yet another aspect, a portable pipe threader including a housing, a carriage supported by the housing, and at least one pipe threading tool coupled to the carriage and selectively operable to perform work on a pipe. A drive assembly is at least partially positioned within the housing, the drive assembly including an electric motor operable to provide torque to the pipe. A lubrication system includes a catch basin provided on one side of the housing, a reservoir for holding a lubricant, a return port provided in the catch basin for passing lubricant into the reservoir, and a pump powered by the drive assembly to establish a flow of lubricant from the reservoir. A first baffle wall extends upwardly from a bottom wall of the reservoir, and a downwardly-depending second baffle wall extends from a bottom side of the catch basin at a position between the first baffle wall and the return port. The first and second baffle walls overlap vertically such that lubricant passing from the return port to an intake of the pump must pass below the second baffle wall and change directions, vertically upward along the first baffle wall in order to pass the first baffle wall, thereby forming a particle collection zone at the bottom of the first baffle wall.

Other features and aspects of the invention will become apparent by consideration of the following detailed description and accompanying drawings.

BRIEF DESCRIPTION OF THE DRAWINGS

FIG. 15 is a cross-section of the lubrication system taken along line 13-13 of

FIG. 12.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
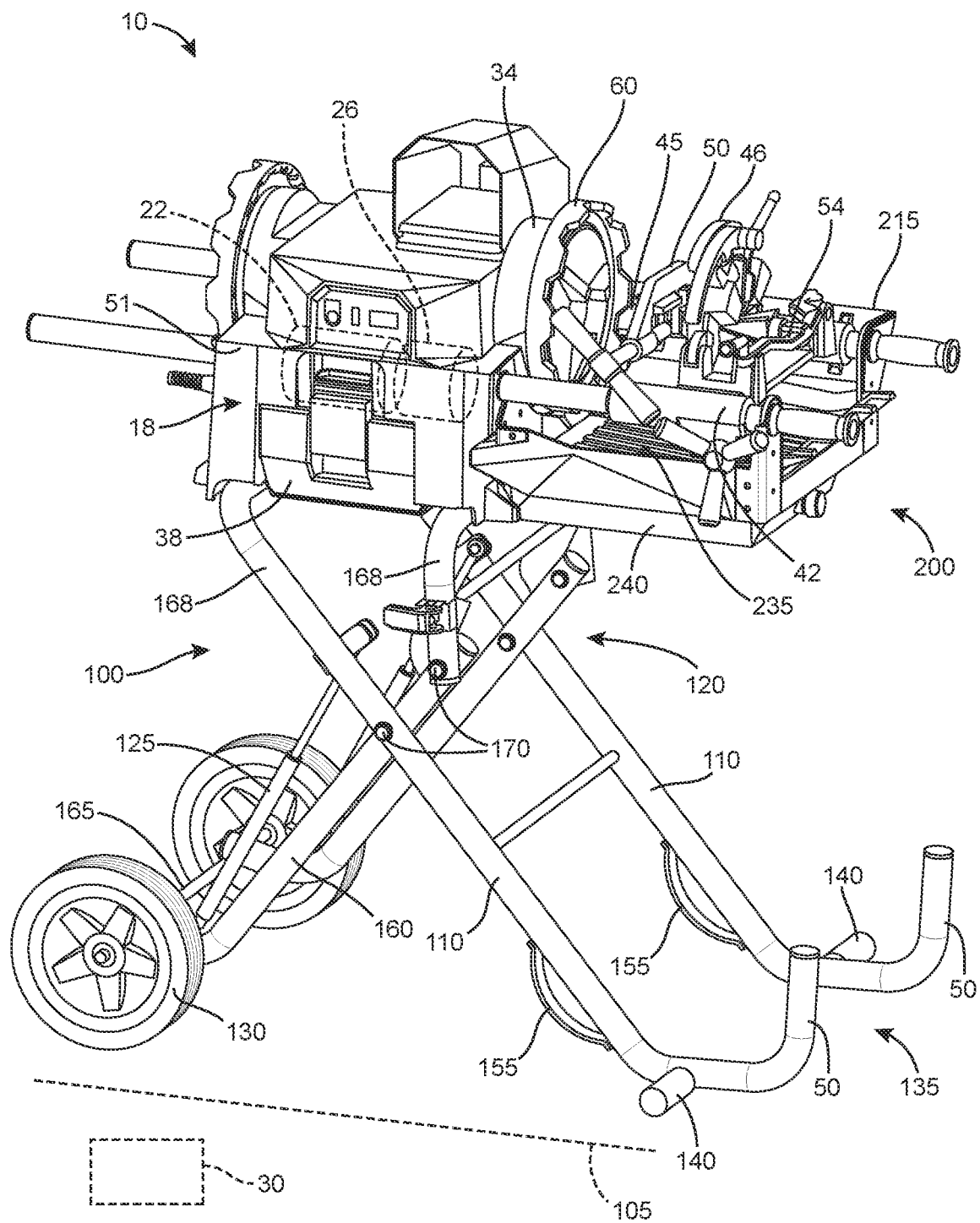
FIG. 1 is a perspective view of a portable pipe threader in accordance with an embodiment of the invention.

With reference to FIG. 1, a portable pipe threader 10 includes a stand 100 and a main housing 51 supported on the stand 100, and a carriage 42 supported on the main housing 51 having a plurality of pipe threading tools 46, 50, 54 supported by the carriage 42. The pipe further includes a drive assembly 18 housed within the main housing 51 and mounted to the stand 100 having a motor 22 (e.g., a brushless direct current electric motor), a gear box 26 coupled to the motor 22 having an output gear (not shown), an electronic speed selection switch, such as a pedal 30, that selectively controls the drive assembly 18, and a plurality of guide rails 45 configured to support the carriage 42. The drive assembly 18 is powered by a battery pack 38 supported by the stand 100 in selective electrical communication with the motor 22 to provide electrical power to the motor 22. In some constructions, the battery pack 38 and the motor 22 can be configured as an 18 Volt high power battery pack and motor, such as the 18 Volt high power system disclosed in U.S. patent application Ser. No. 16/045,513 filed on Jul. 25, 2018 (now U.S. Patent Application Publication No. 2019/0044110), the entirety of which is incorporated herein by reference. In other constructions, the battery pack 38 and the motor 22 can be configured as an 80 Volt high power battery pack and motor, such as the 80 Volt battery pack and motor disclosed in U.S. patent application Ser. No. 16/025,491 filed on Jul. 2, 2018 (now U.S. Patent Application Publication No. 2019/0006980), the entirety of which is incorporated herein by reference. In such a battery pack 38, the battery cells within the battery pack 38 have a nominal voltage of up to about 80 V. Further, in another embodiment, the battery cells within the battery pack 38 have a nominal voltage of up to about 120 V. In some embodiments, the battery pack 38 has a weight of up to about 6 lb. In some embodiments, each of the battery cells has a diameter of up to 21 mm and a length of up to about 71 mm. In some embodiments, the battery cells within the battery pack 38 are cylindrical battery cells, prismatic battery cells, pouch battery cells, or a combination thereof. In some embodiments, the battery pack 38 includes up to twenty battery cells. In other embodiments, the battery pack 38 includes up to thirty battery cells, up to forty battery cells, up to forty-five battery cells, or greater. In some embodiments, the battery cells are disposed in a single pack. In other embodiments, the battery cells are disposed in multiple packs, i.e., two packs, three packs, four packs, etc. In some embodiments, the battery cells are connected in series. In some embodiments, the battery cells are operable to output a sustained operating discharge current of between about 20 A and about 140 A, for example, about 40 A and about 60 A. In some embodiments, each of the battery cells has a capacity of between about 1.7 Ah and about 15.0 Ah. And, in some embodiments of the motor 22 when used with the 80 Volt battery pack 38, the motor 22 has a power output of at least about 2760 W and a nominal outer diameter (measured at the stator) of up to about 80 mm, up to about 100 mm, up to about 120 mm, up to about 140 mm, or greater.

With reference to FIG. 1, the drive assembly 18 further includes a drive element 34 (e.g., a drive tube) coupled to the gear box 26 and powered by the motor 22. The motor 22 is configured to supply torque to the output gear of the gear box 26 and rotatably drive the drive element 34 to rotate a pipe (not shown) or a selected one of the plurality of pipe threading tools. The pedal 30 is operable to activate the motor 22 and control a relative speed at which the pipe rotates. In other embodiments, the relative speed at which the pipe rotates can be selected using an electronic speed selection switch other than the pedal 30 (e.g., dial, keypad, button, etc.; not shown).

With continued reference to FIG. 1, the portable pipe threader 10 further includes a spindle 60 in which the pipe is clamped. The drive element 34 interconnects the spindle 60 and the output gear of the gear box 26. Thus, torque from the motor 22 is transferred to the spindle 60, causing it and the pipe to rotate, via the gear box 26 and the drive element 34. With reference to FIG. 1, the plurality of pipe threading tools 46, 50, 54 includes a die holder 46 having a plurality of dies (not shown) to cut threads on the pipe, a pipe cutter 50 to trim excess pipe, and a pipe reamer 54 to deburr, or otherwise smooth, an inner edge of a cut end of a pipe. The plurality of pipe threading tools 46, 50, 54 remain stationary on the carriage 42 while the pipe is rotated by the spindle 60. The portable pipe threader 10 also includes a lubrication system 200 (FIG. 2) configured to provide lubricant to the pipe during a threading operation using the die holder 46 and a particular die (not shown) installed therein.

Figure 9:
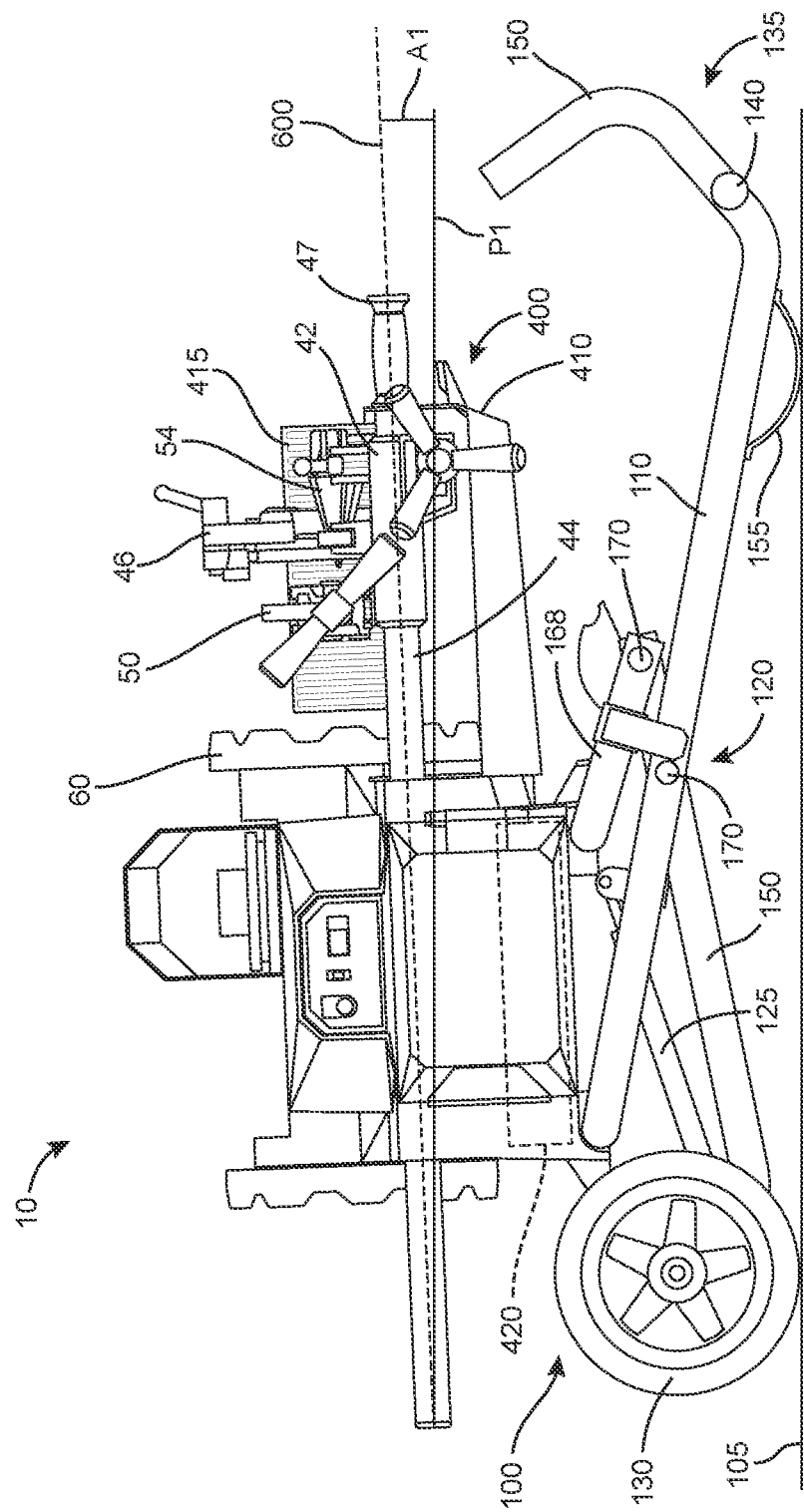
FIG. 9 is a side view of the portable pipe threader of FIG. 1 with a stand in a collapsed state.

With continued reference to FIG. 1, the stand 100 includes an upright portion 168 configured to support the threader 10 and a stand locking mechanism 120 for selectively locking the stand 100 in a deployed state (FIG. 1) and a collapsed state (FIG. 9). The stand 100 further includes a plurality of first and second support legs 110, 160 pivotably coupled via rotatable joints 170 (e.g., bolts, screws, etc.), an axle 165 pivotably coupled to the second support legs 160 having a plurality of wheels 130, a plurality of list-assist springs 125 for aiding the stand 100 from moving from the collapsed state to the deployed state, and a handle assembly 135 integrated with the first support legs 110 having feet portions 140 to support the threader 10 in the deployed state where the threader 10 is elevated from a work surface 105 during use. The handle assembly 135 further includes grip portions 150 for the user to grasp the stand 100 during transport of the threader 10 and loading skis 155 coupled to the first support legs 110 for allowing the stand 100 to travel more easily over difficult surfaces when it is being transported (e.g., being pulled up stairs).

Figure 2:
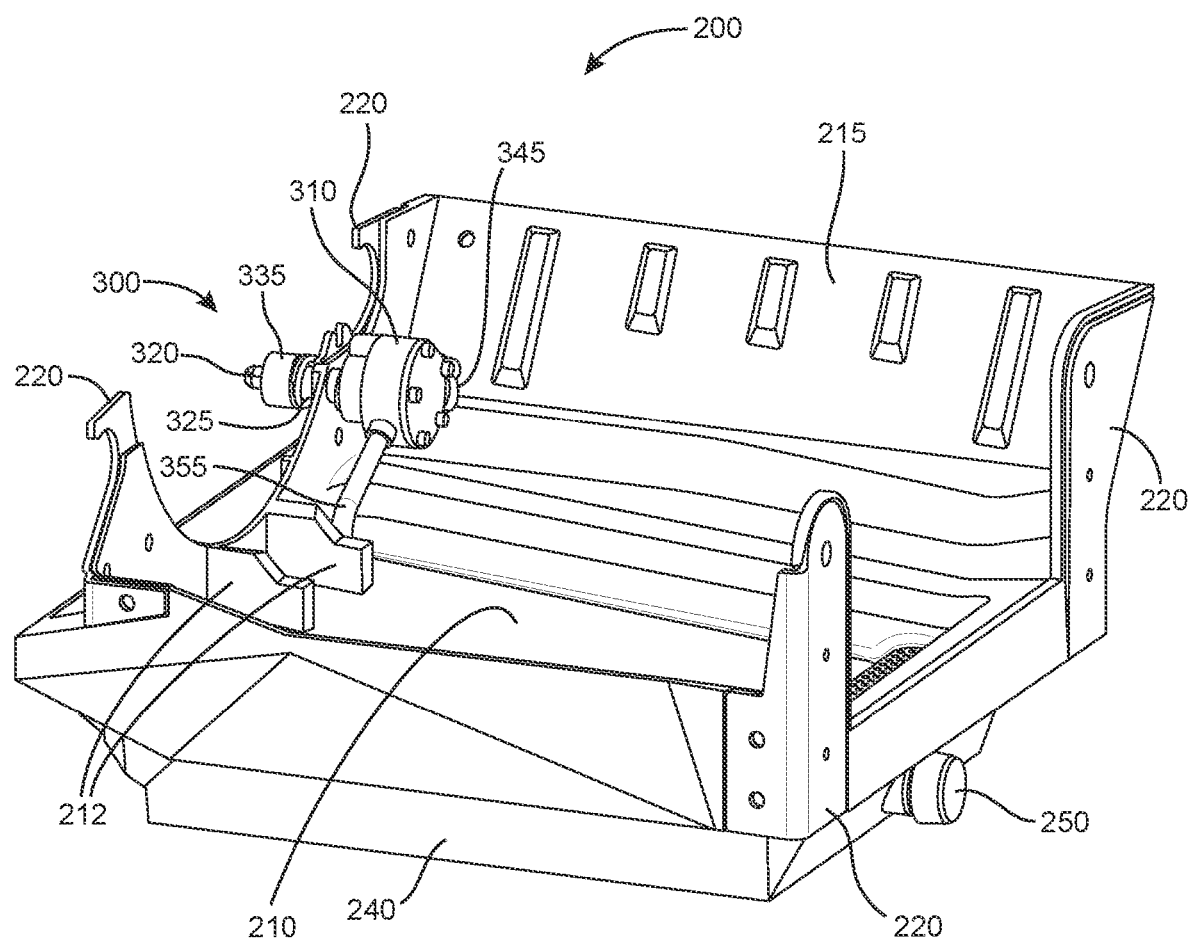
FIG. 2 is a perspective view of an embodiment of a lubrication system for use with the portable pipe threader of FIG. 1.
Figure 4:
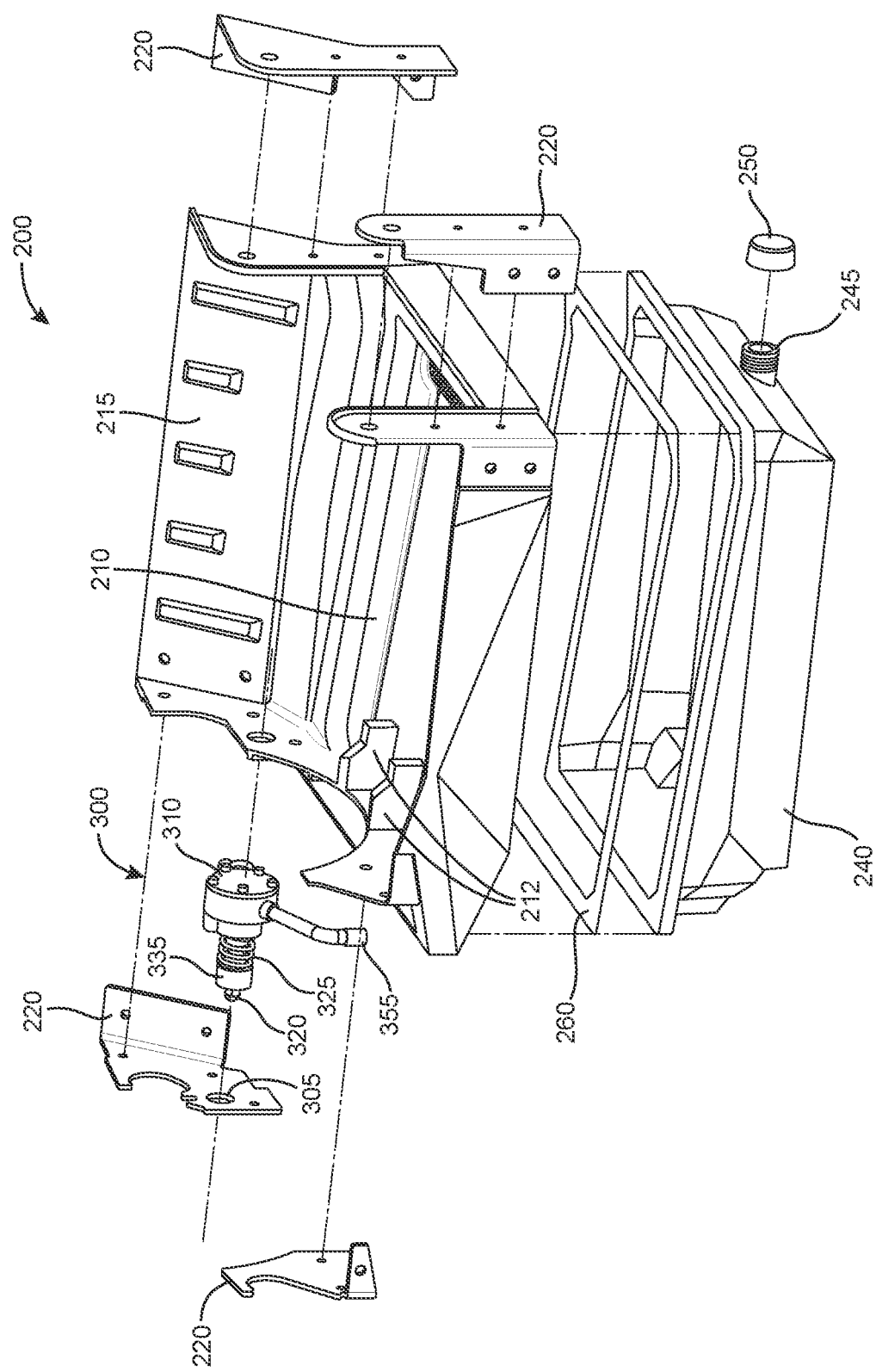
FIG. 4 is an exploded view of the lubrication system of FIG. 2.
Figure 5:
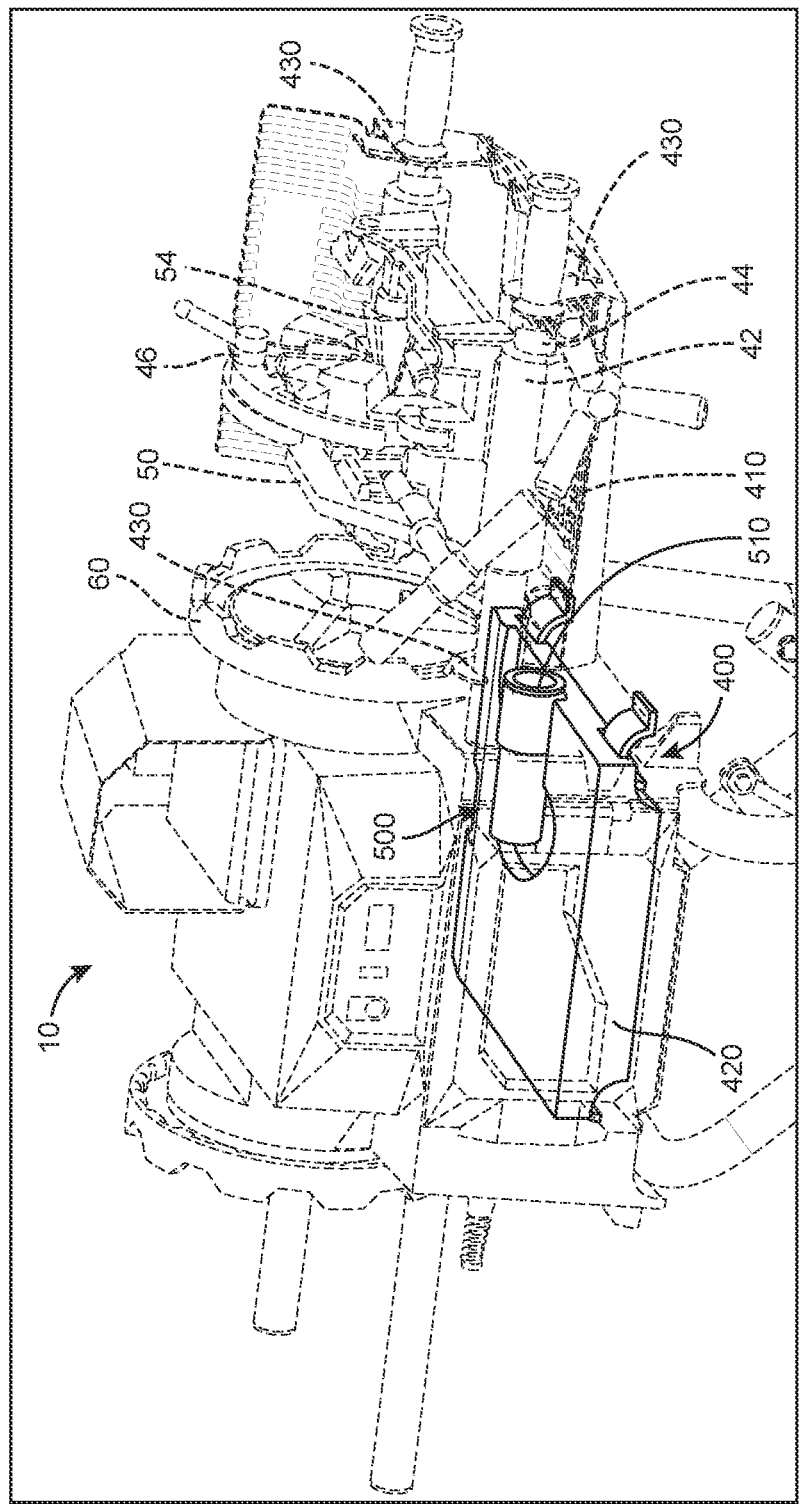
FIG. 5 is a perspective, partial cutaway view of another embodiment of a lubrication system for use with the portable pipe threader of FIG. 1.
Figure 6:
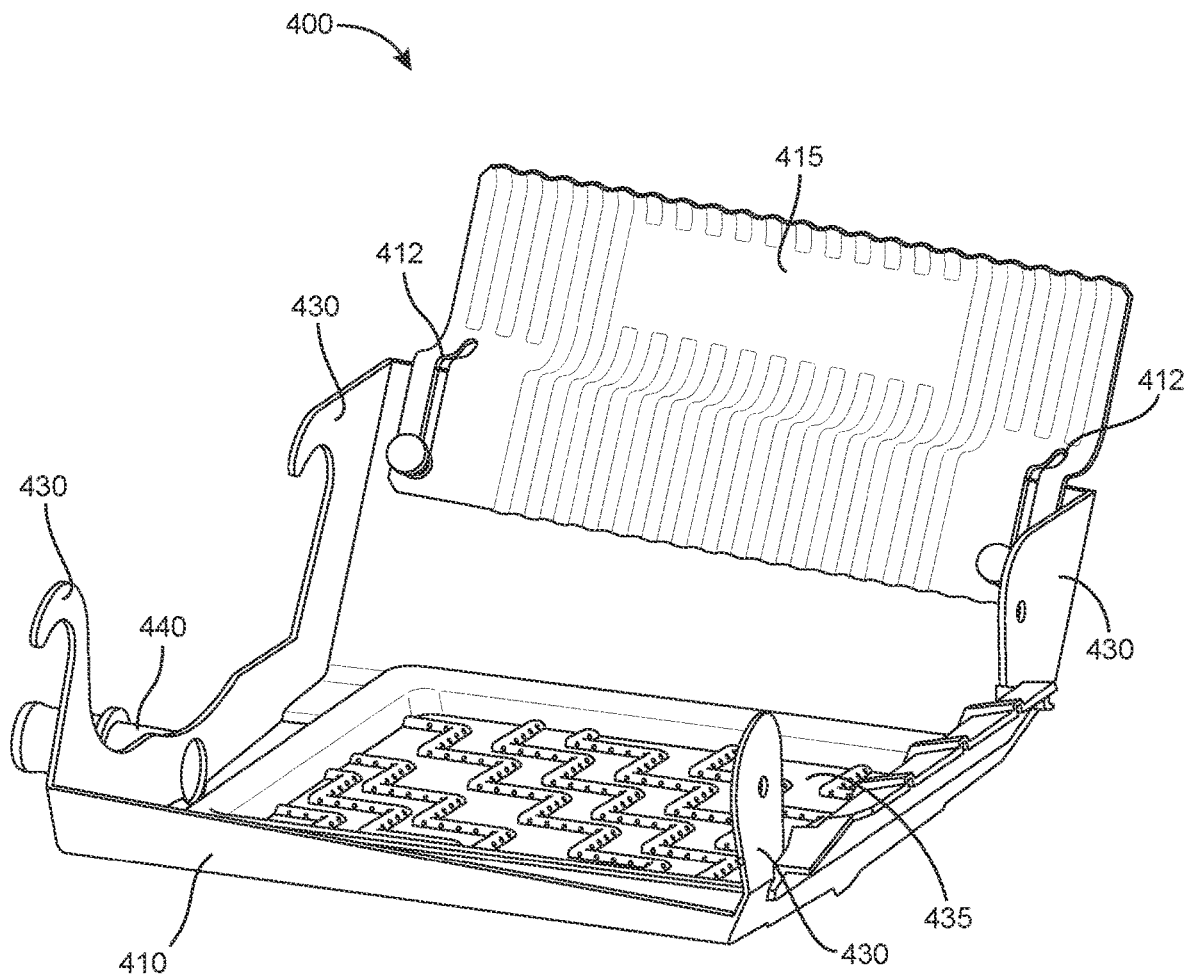
FIG. 6 is a perspective view of a portion of the lubrication system of FIG. 5.
Figure 7:
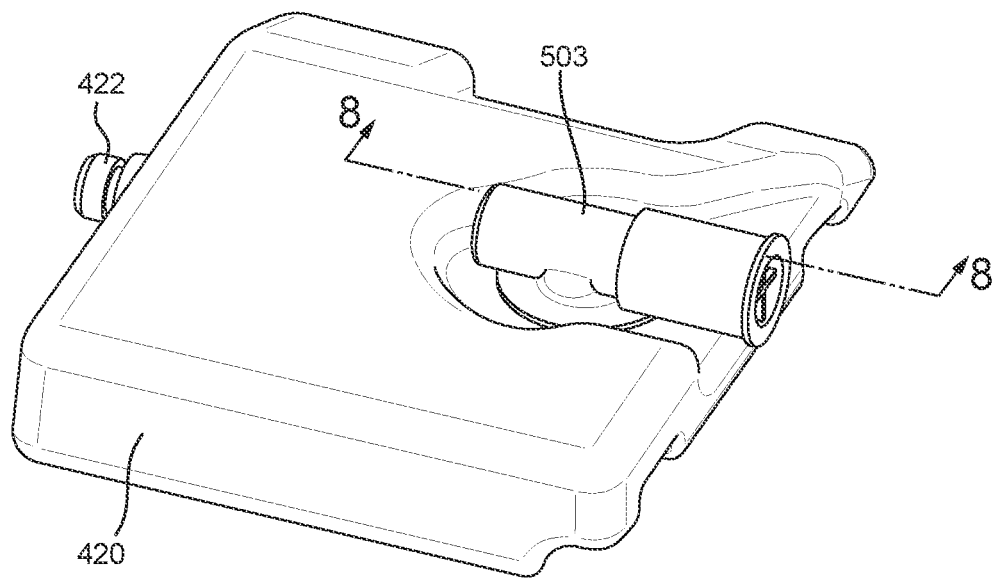
FIG. 7 is a perspective view of a portion of the lubrication system of FIG. 5.
Figure 8:
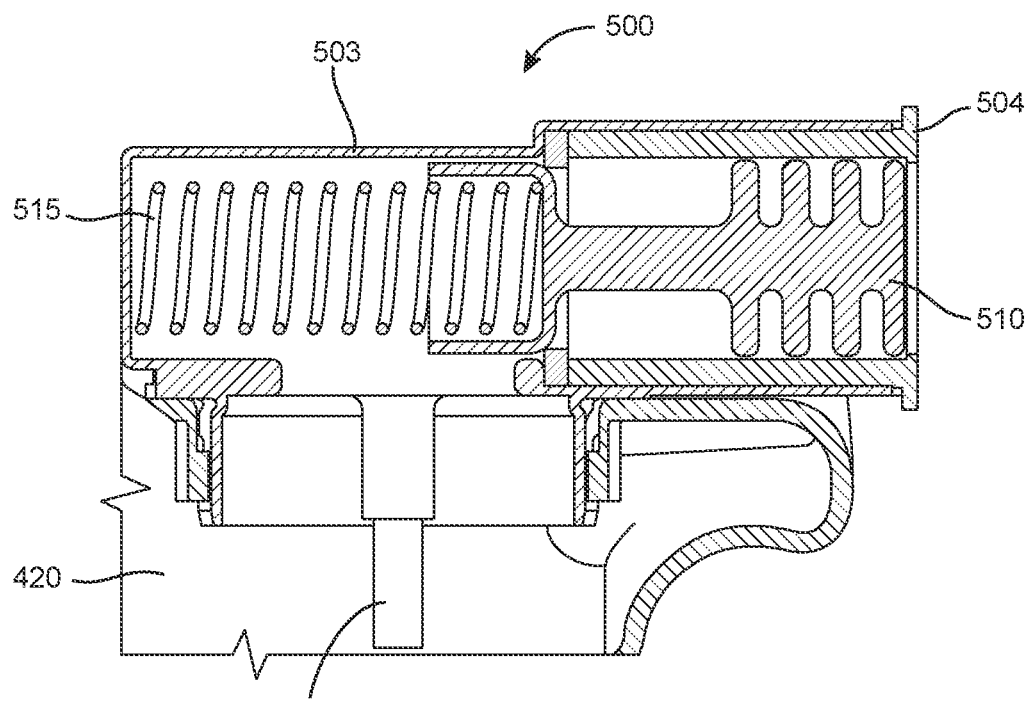
FIG. 8 is a cross-sectional view of a sealing mechanism for use with the lubrication system of FIGS. 5-7.

FIG. 2 illustrates the lubrication system 200 for use with the threader 10. The lubrication system 200 is removably couple to, or engaged with, the housing 51 of the threader 10. As shown, the system 200 includes a catch basin 210 having a shroud 215 for collecting the lubricant that is sprayed from the pipe as it is undergoing work from one of the pipe threading tools 46, 50, 54, a plurality of brackets 220 for selectively mounting the system 200 to the guide rails 44, and a debris shield 235 (FIG. 1) for allowing lubricant to pass into the basin 210 while preventing larger debris (i.e., metal chips) from passing through. As shown in FIG. 4, the catch basin 210 includes one or more raised ledges 212 for supporting a first edge of the debris shield 235. The raised ledges 212 are provided on a first or proximal end of the catch basin 210 that is positioned adjacent the housing 51 and the drive assembly 18. An opposite end of the catch basin 210 includes one or more lubricant openings to pass lubricant into a reservoir 240 positioned underneath the basin 210 for collecting lubricant. The lubrication system 200 further includes a pump assembly 300 mounted to the basin 210 via a mounting aperture 305 in one of the brackets 220 (FIG. 4), a drain 245 having a drain cap 250 positioned at lower portion of the reservoir 240, and a seal 260 positioned between the basin 210 and the reservoir 240 to seal the basin 210 and the reservoir 240 to prevent leakage. During use of the system 200, the basin 210 is configured to be slightly inclined downward along the guide rails 44 and away from the main housing 51 in order to direct the lubricant away from the pipe and into the reservoir 240.

Figure 3A:
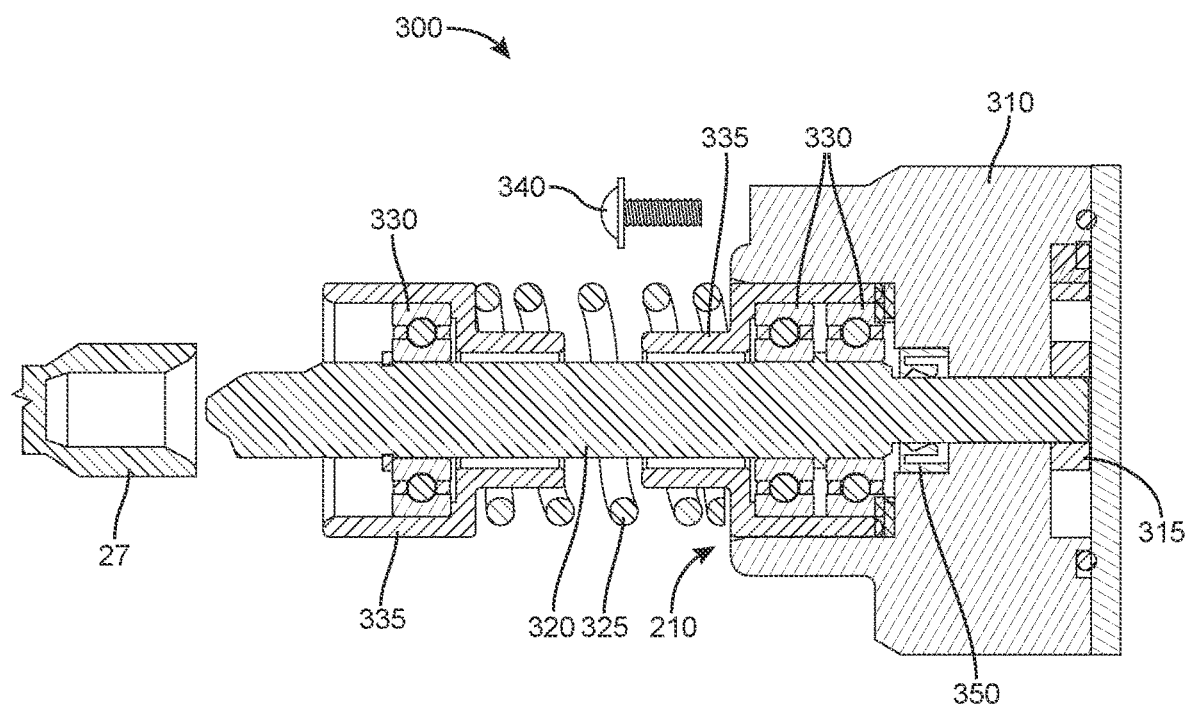
FIG. 3A is a cross-sectional view of a pump assembly for use with the lubrication system of FIG. 2.

With reference to FIGS. 2-4, the pump assembly 300 includes a pump housing 310, a pump drive shaft 320 extending from the housing 310, a positioning spring 325 surrounding the drive shaft 320 for guiding the alignment of the shaft 320, a plurality of bearings 330 for supporting the drive shaft 320, and a plurality of bearing cups 335 for housing each of the respective bearings 330. The pump assembly 300 further includes a lip seal 350 positioned between the drive shaft 320 and the housing 310 for sealing the drive shaft 320 with respect to the pump housing 310, a pump intake 355 for drawing lubricant from the reservoir 240, a pump outlet 345 (FIG. 2) for fluidly coupling a hand-held oiling system or an onboard oiling system integrated with the pipe threader 10, and a fastener 340 for limiting the travel freedom of the housing 310 to the basin 210 (via the bracket 220).

When the lubrication system 200 is mounted to the guide rails 44, the positioning spring 325 is configured to facilitate the alignment of the pump drive shaft 320 with a gearbox output 27 for rotatably driving the pump 315. The gearbox output 27 is configured to be selectively rotatably driven by the gearbox 26 in order to let the user cycle between powering just the pump assembly 300, just the threader 10, or both the pump assembly 300 and the threader 10 simultaneously. To further aid in the alignment of the drive shaft 320 with the gearbox output 27, the positioning spring 325 allows the assembly 300 to rotate in any direction within the mounting aperture 305. Furthermore, sufficient clearance exists (e.g., 2 mm) between the mounting aperture 305 and the bearing cup 335 to permit the pump housing 310 to translate in one or more directions relative to the bracket 220 to easily pilot the drive shaft 320 into the gearbox output 27.

Figure 3B:
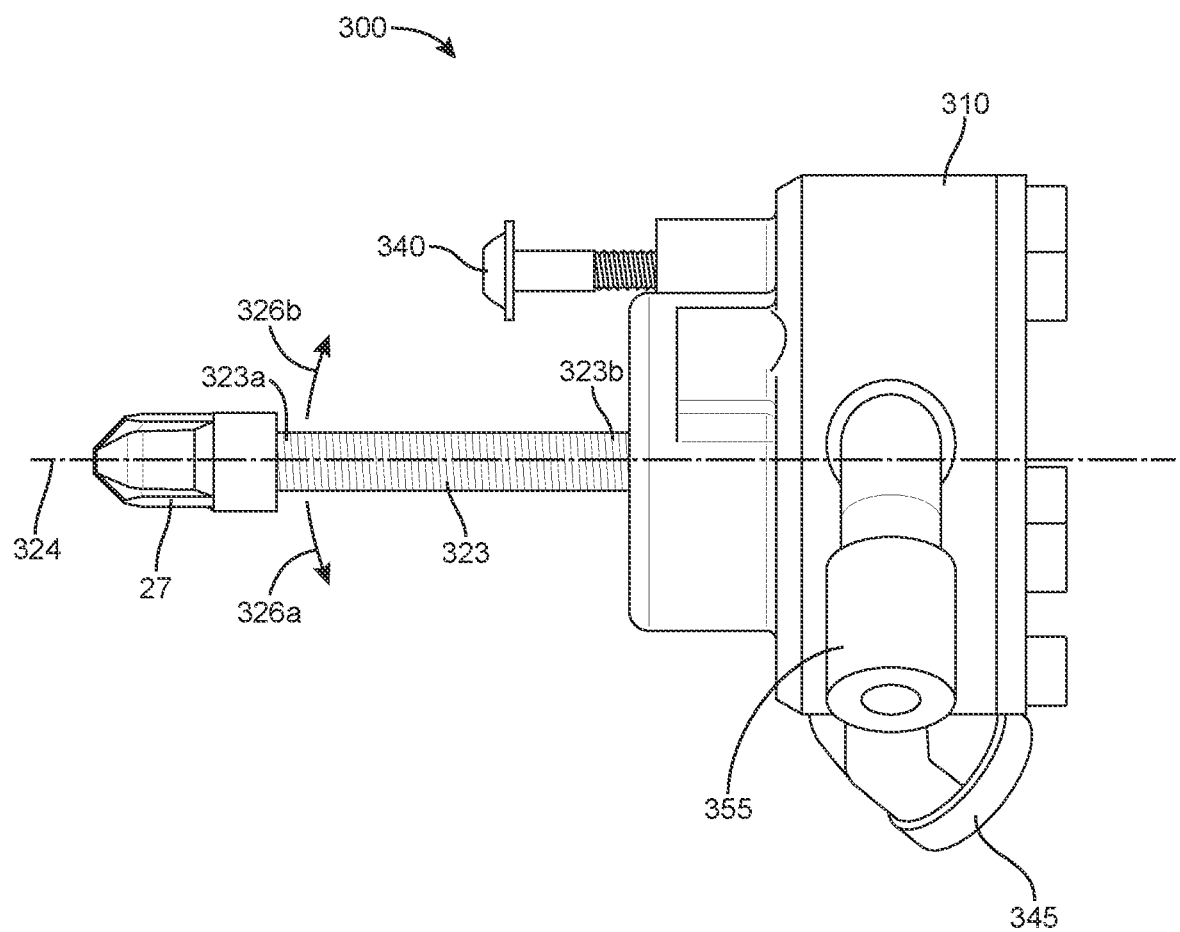
FIG. 3B is a side view of a pump assembly for use with the lubrication system of FIG. 2 in accordance with another embodiment of the invention.

FIG. 3B illustrates a flexible guide shaft 323 that can replace the rigid drive shaft 320 in some embodiments of the pump assembly 300. The flexible drive shaft 323 is configured to ensure proper alignment with the gearbox output 27 when the system 300 is mounted to the guide rails 44. Additionally, the flexible drive shaft 323 can reduce the stresses that could be transmitted from the shaft 323 to the pump assembly 300 due to poor alignment with the gearbox output 27. The flexible drive shaft 323 is formed from a wire wound into a helix and this configuration allows the flexible drive shaft 323 to be bendable in all directions, as indicated by arrows 326a, 326b relative to a center axis 324 of the flexible drive shaft 323 in its relaxed, straight configuration. For example, the free end 323a of the flexible drive shaft 323 is bendable up to and including ninety degrees (90°) relative to the fixed end 323b of the flexible drive shaft 323 in any direction from the center axis 324.

With continued reference to FIGS. 2-4, the lubrication system 200 is configured to be completely modular, meaning that the entire system 200 is selectively mountable to the guide rails 44 such that when the system 200 is removed, the system 200 becomes a closed system, effectively sealing off both the pump assembly 300 and the gearbox output 27, thereby preventing any oil leak paths from the system 200 or to the gear box 26. Since the system 200 is removable, this gives the user the option to remove the system 200 when the application of lubricant to the pipe is unnecessary. Also, this allows the user to selectively reduce the weight of the threader 10 during transport or when the user is adjusting the threader 10 between the collapsed and deployed states. Additionally, the lubrication system 200 is only operable while the system 200 is mounted to the threader 10 and the drive shaft 320 receives torque from the gearbox output 27, which reduces unnecessary wear on the pump 315 and the gearbox 26.

FIGS. 5-8 illustrate a lubrication system 400 for use with another embodiment of the threader 10. The lubrication system 400 is configured as an integrated system being partially housed within the housing 51 of the threader 10. The system 400 includes a basin 410 having a plurality of mounting brackets 430 for mounting the basin 410 to the guide rails 44, a shroud portion 415 movable relative to the basin 410 along guide grooves 412 for collecting the lubricant that is sprayed from the pipe as it is undergoing work from one of the pipe threading tools 46, 50, 54, and a debris shield 435 (FIG. 6) for collecting larger debris (i.e., metal chips) and preventing such debris from flowing into a drain 440 located at a lower portion of the basin 410.

The lubrication system 400 further includes a valve assembly 500 for fluidly coupling the drain 440 to a reservoir 420 housed within the housing 51 of the threader 10. The valve assembly 500 is also configured to seal the reservoir 420 when the reservoir 420 is removed, or otherwise disengaged, from the basin 410 and removed from the threader 10. The valve assembly 500 includes a housing 503, a valve 510 located within the housing 503, a compression spring 515 for biasing the valve 510 toward a seat defining an inlet 504 to the reservoir 420, and a tube 445 extending into the reservoir 420 for depositing the lubricant flowing from the basin 410 into the reservoir 420. To couple the basin 410 to the reservoir 420, the user mounts the basin 410 onto the guide rails 44 and inserts the drain 440 into the inlet 504, which biases the valve 510 rearward against the bias of the spring 515, thereby allowing lubricant to flow freely between the basin 410 and the reservoir 420. If the user wishes to empty the reservoir 420, the reservoir 420 has an end cap 422 that can be removed to drain the lubricant.

Figure 10:
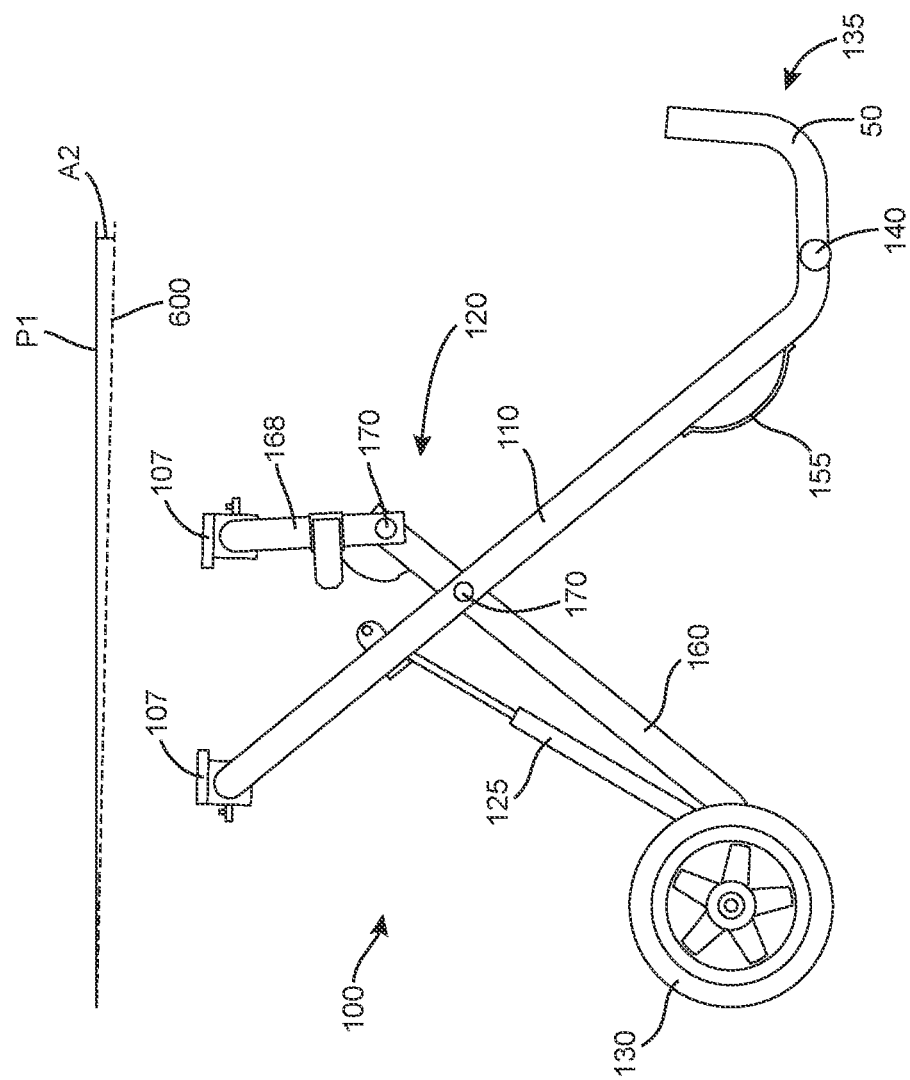
FIG. 10 is a side view of the stand of FIG. 9 in a deployed state.
Figure 11:
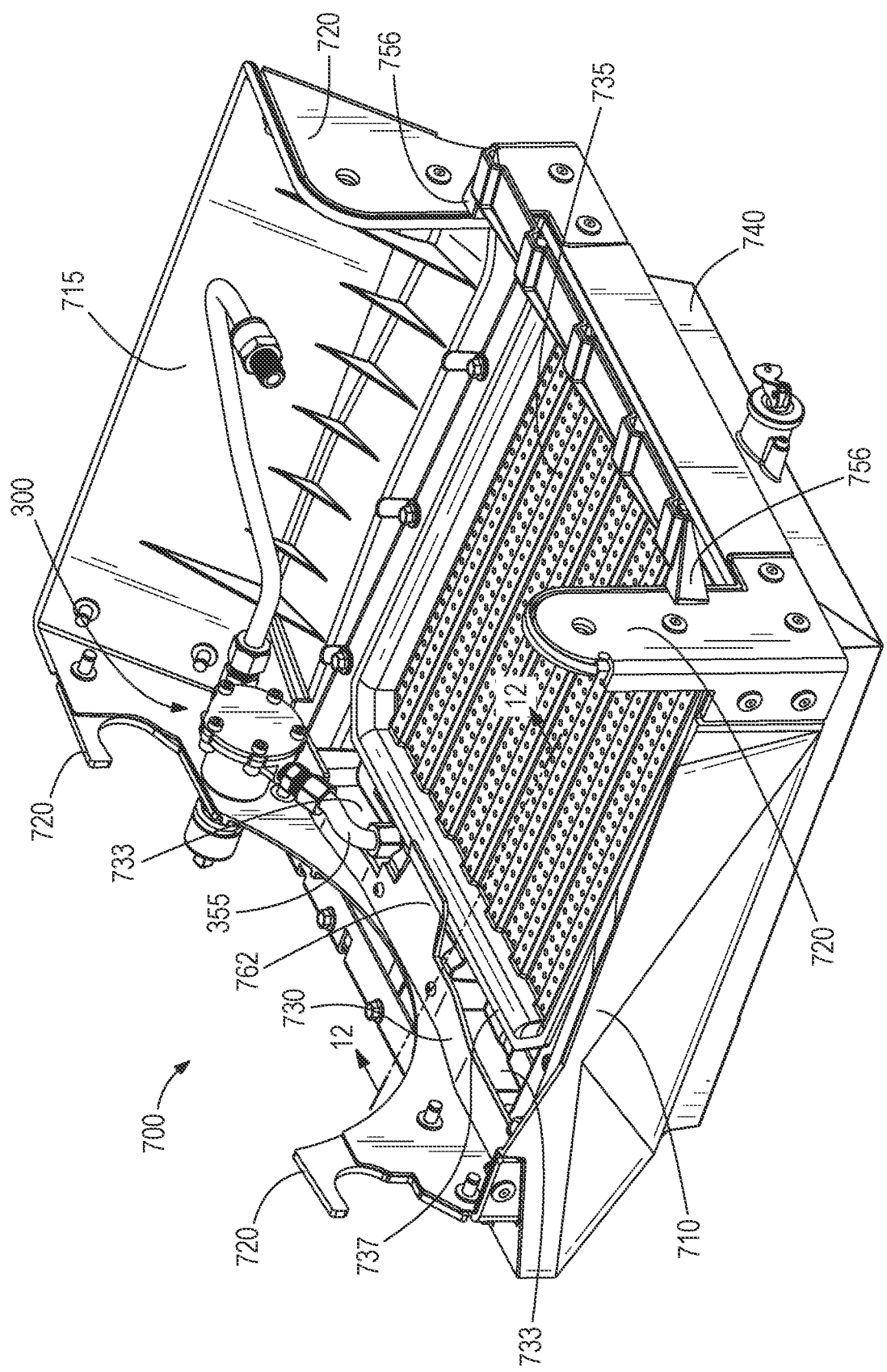
FIG. 11 is a perspective view of a lubrication system in accordance with another embodiment of the invention.

FIG. 9 illustrates an embodiment of the threader 10 using the integrated lubrication system 400 in the collapsed state where the stand 100 and threader 10 are oriented adjacent the work surface 105. In this state, the threader 10 is supported on the stand 100 via a plurality of brackets 107 (FIG. 10) located on the upright 168 configured to incline the main housing 51 slightly rearward along a spindle axis 600 at a first oblique angle Al with respect to a reference plane P1, with the pipe threading tools 46, 50, 54 being at a higher elevation than the spindle 60, to promote drainage of the lubricant from the basin 410 into the reservoir 420. In some embodiments, the first oblique angle Al is between, and including one to two degrees (1°-2°) above a horizontal line. Alternatively, in the deployed state (FIG. 10), the main housing 51 is angled slightly forward along the spindle axis 600 at a second angle A2 with respect to the reference plane P1, with the pipe threading tools 46, 50, 54 being at a lower elevation than the spindle 60, to permit lubricant to flow away from the pipe as work is being performed—also preventing lubricant from collecting in and/or flowing through the pipe. In some embodiments, the second oblique angle A2 is between, and including, one to two degrees (1°-2°) below the horizontal reference plane P1. Although the stand 100 providing the first and second angles A1, A2 is illustrated with the integrated lubrication system 400, it may also be incorporated with other lubrication systems disclosed herein, and variations thereof.

Figure 12:
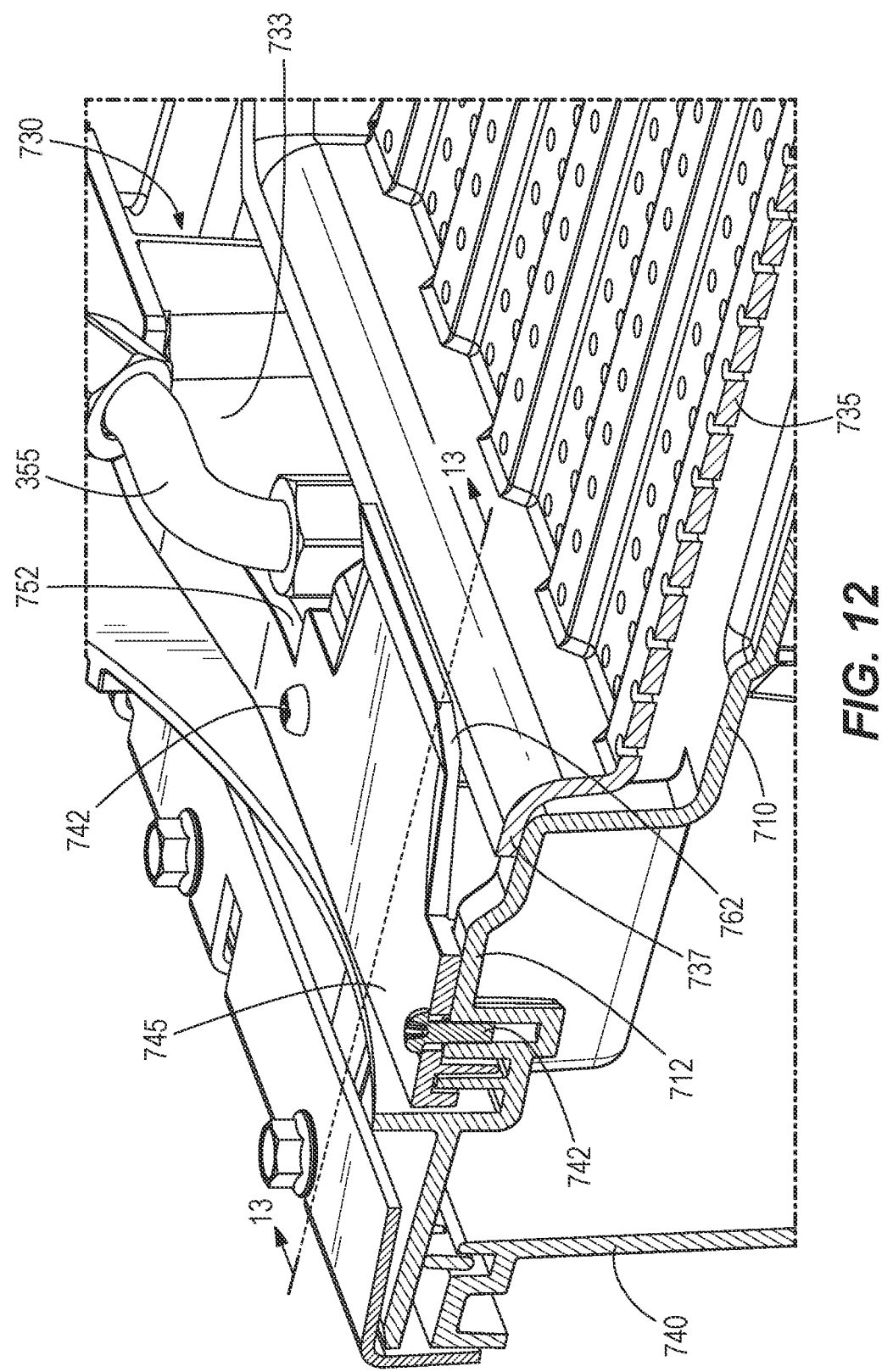
FIG. 12 is a cross-section of a portion of the lubrication system taken along line 12-12 of FIG. 11.
Figure 13:
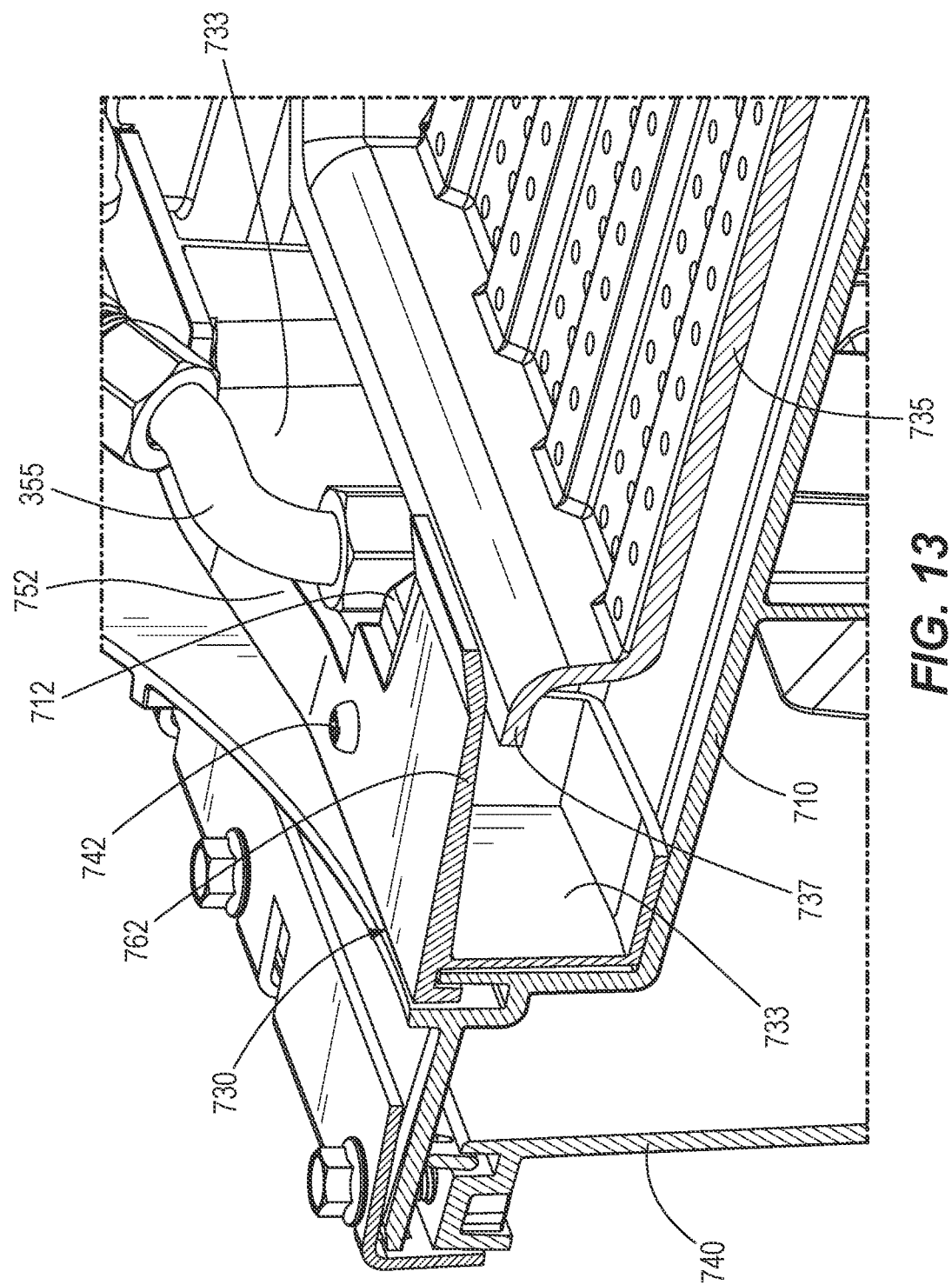
FIG. 13 is a cross-section of a portion of the lubrication system taken along line 13-13 of FIG. 12.
Figure 14:
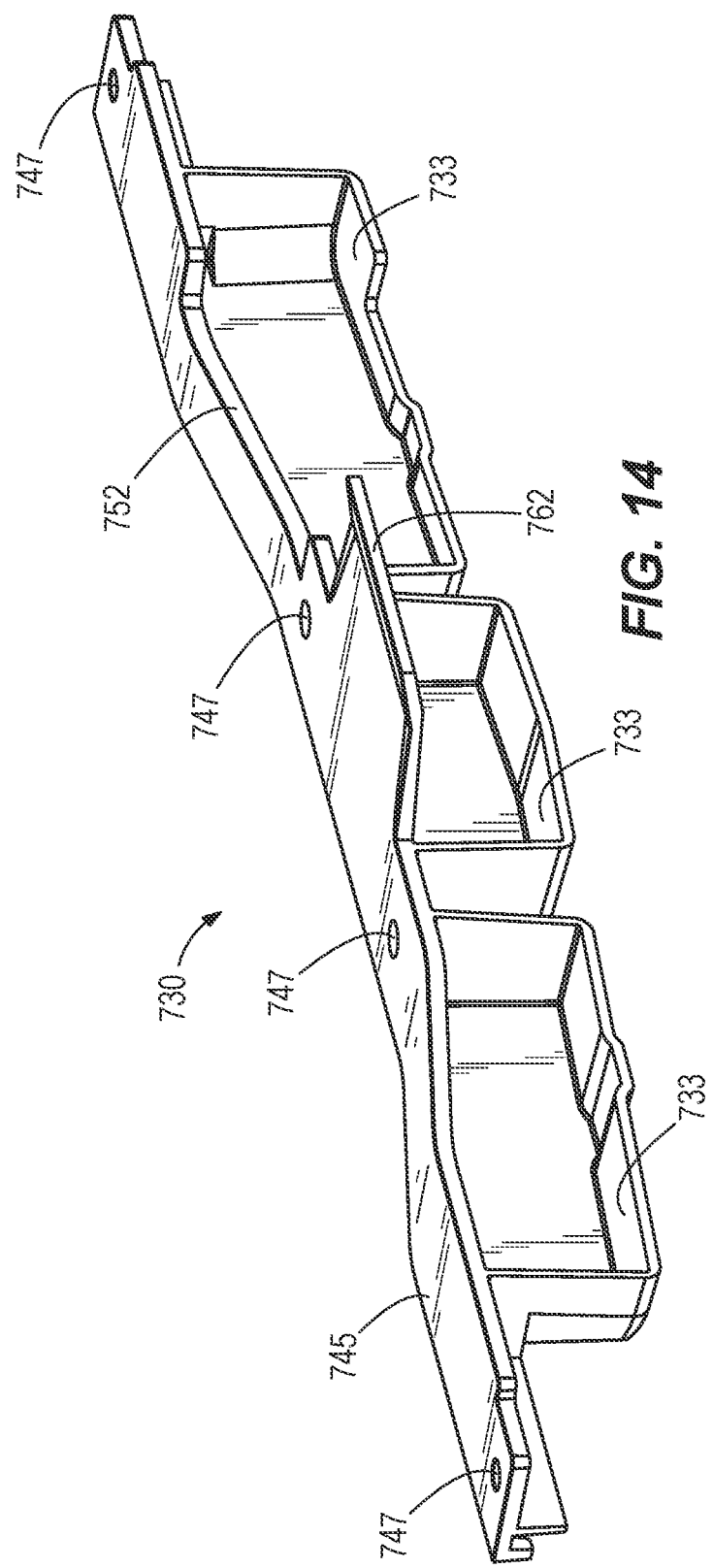
FIG. 14 is a perspective view of a drip catch of the lubrication system of FIGS. 11-13.

FIGS. 11-15 illustrate another lubrication system 700 that is similar in most respects to the lubrication system 200 of FIGS. 1, 2 and 4 in that it includes a catch basin 710 positioned directly over a lubricant reservoir 740. The catch basin 710 includes a shroud 715 and a plurality of mounting brackets 720. As with the lubrication system 200, the reservoir 740 is positioned outside of the housing 51 of the threader 10. A debris shield 735 is situated within the catch basin 710 and provided with small lubricant apertures such that the debris shield 735 passes lubricant from its upper side to its lower side and into the reservoir 740 while blocking or catching debris at the upper side to prevent its passage into the reservoir 740. The lubrication system 700 further includes a drip catch 730 mounted in the catch basin 710 at the proximal end (i.e., the end extending along the housing 51) of the catch basin 710. As shown in FIG. 14, the drip catch 730 includes one or more pockets or cups 733 that open toward the debris shield 735 and toward a center of the catch basin 710. In other words, the drip catch pockets 733 are open in a horizontal direction when the pipe threader 10 is in either of the positions of FIGS. 1 and 9.

When the stand 100 is collapsed, the threader 10 can be stowed in a horizontal stowed position as shown in FIG. 9, or alternately a vertically stowed position in which the grip portions 150 are positioned vertically above the wheels 130 (i.e., the threader 10 rotated counter-clockwise approximately 90 degrees from the orientation of FIG. 9). The vertically stowed position can enable the user to prop the threader 10 up against a wall, for example. In the vertically stowed position, ends of the guide rails 44 may be in contact with the ground, while the handle assembly 135 with its grip portions 150 is vertically above. Thus, the debris shield 735 is also oriented substantially vertically, as opposed to its substantially horizontal operational position. In the vertically stowed position, following use of the threader 10 involving lubricant supply, remnant lubricant will flow along the debris shield 735 toward the proximal edge 737 of the debris shield 735. The drip catch 730 is oriented such that the pockets 733 are open vertically upward in the vertically stowed position, and directly below the proximal edge 737. As such, lubricant can drip from the debris shield 735 into the pockets 733 of the drip catch 730. As long as the threader 10 remains in the vertically stowed position, the lubricant can be retained in the pockets 733 and prevented from spilling out of the catch basin 710. In the illustrated embodiment, there are three pockets 733 in the drip catch 730, and the three pockets 733 are arranged in a row along the proximal end of the catch basin 710. The central pocket 733 is situated between the ledges 712 of the catch basin 710 that support the debris shield's proximal edge 737. The two outboard pockets 733 extend outward from the respective ledges 712 to cover the remainder of the proximal edge 737 of the debris shield 735. Thus, with the exception of the area occupied by the ledges 712, the drip catch 730 covers the entire length of the proximal edge 737 for catching and retaining lubricant dripped from the debris shield 735.

As shown in FIGS. 12 and 13, the drip catch 730 is coupled to the catch basin 710 with a plurality of fasteners 742 through a flange or mounting portion 745 of the drip catch 730. As such, the mounting portion 745 includes a corresponding plurality of fastener holes 747 as shown in FIG. 14. In the illustrated embodiment, there are four fasteners 742—two of which are provided in a central or inboard portion of the drip catch 730 to engage with (e.g., thread into) the ledges 712. As shown in FIG. 12, each ledge 712 can have multiple adjacent steps or lands for supporting the debris shield 735 and the drip catch 730. FIGS. 12 and 13 also illustrate a reduced-width portion or cutout 752 along the mounting portion 745 to accommodate the pump intake 355. In the normal use orientation, the debris shield 735 is held in the catch basin 710 by gravity, although horizontal positioning can be set by one or more registration tabs 756 of the debris shield 735 that engage the outside of the bracket(s) 720 at the distal side, opposite the proximal edge 737. In order to maintain the operational position of the debris shield 735 in the catch basin 710 in a vertically stowed position, the drip catch 730 further includes a retainer tab 762.

The retainer tab 762 can be formed in a central part of the mounting portion 745, as an extension projecting transverse to a primary elongation direction of the drip catch 730. The retainer tab 762 can extend over the proximal edge 737 of the debris shield 735 such that the proximal edge 737 is sandwiched (with or without direct contact) between the one or more ledges 712 of the catch basin 710 and the retainer tab 762. A small clearance (e.g., 3 mm or less) may be provided between the retainer tab 762 and the debris shield 735 to block the proximal edge 737 of the debris shield 735 from substantial movement away from the catch basin 710. In other constructions, the retainer tab 762 can be elastically deflected by contact with the proximal edge 737 in the normal assembly condition. In any case, the retainer tab 762, which may be the only retainer tab or one of a plurality, prevents the accidental disassembly of the debris shield 735 from the catch basin 710. The retainer tab 762 also ensures that the proximal edge 737 remains in a position to drip lubricant directly into the pockets 733 in a vertically stowed position of the threader 10.

Figure 15:
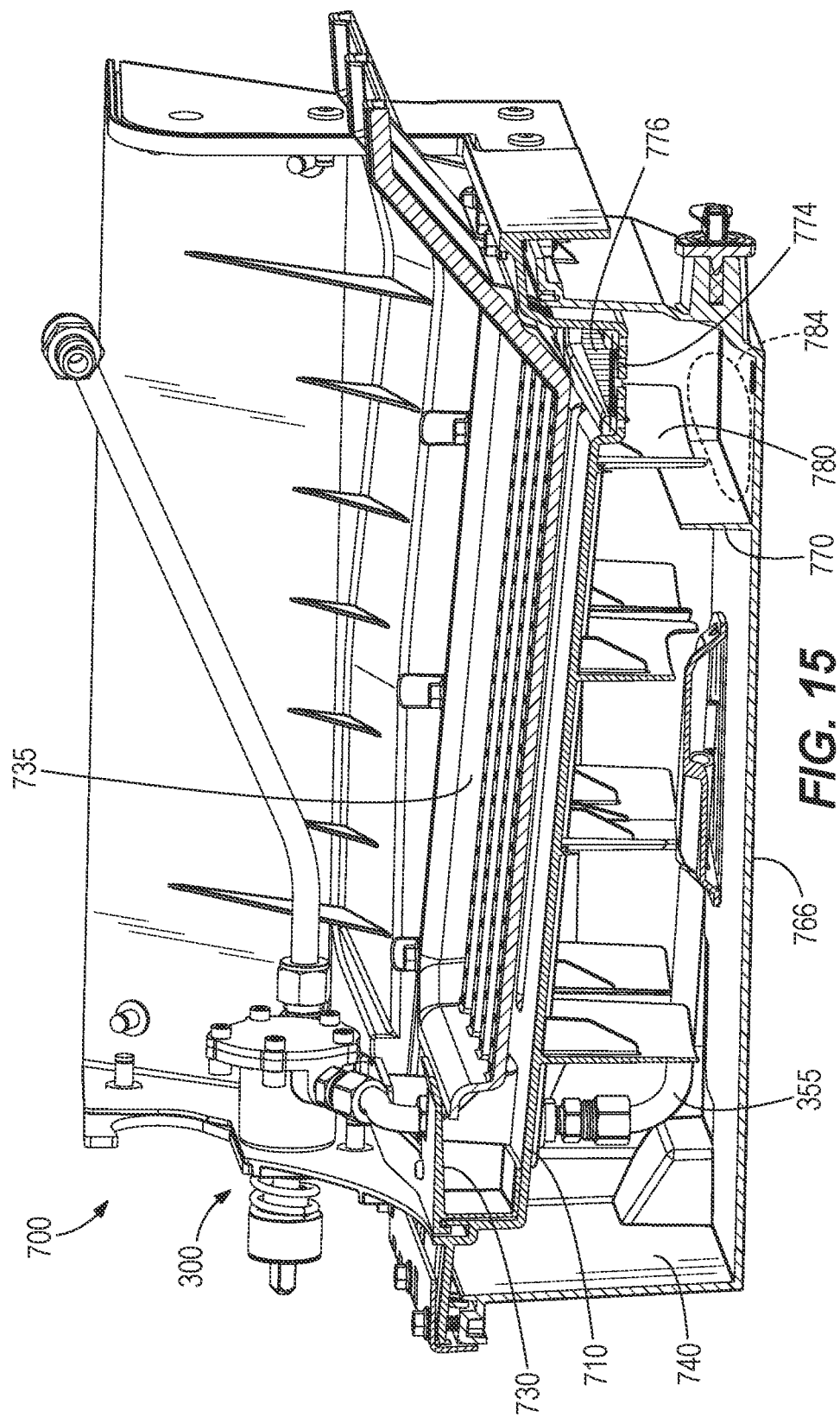

In the lubricant reservoir volume below the catch basin 710 and above a bottom wall 766 of the reservoir 740, the lubrication system 700 includes one or more structures configured to change the lubricant flow direction and velocity in order to inhibit the passage of solid particles (e.g., dirt, metal, etc.) toward the pump intake 355. In particular, FIG. 15 illustrates that the reservoir 740 includes a baffle wall 770 extending up from the bottom wall 766. The baffle wall 770 can be integrally formed with the bottom wall 766 or separate and affixed thereto. The baffle wall 770 can extend across the entire reservoir 740, between two opposite side-walls so that lubricant returning to the reservoir 740 from a return port 774 of the catch basin 710 (e.g., with a filter 776) must traverse over the baffle wall 770 to reach a terminal end of the pump intake 355. The baffle wall 770 extends up to a height that is in some constructions at least 30 percent, or at least 40 percent of a distance between the bottom wall 766 and the bottom of the catch basin 710 at the location of the baffle wall 770. In some constructions, the baffle wall 770 has a height of at least 15 mm, or at least 20 mm. In addition to the baffle wall 770 of the reservoir 740, a downwardly depending second baffle wall 780 extends from the catch basin 710 at a position between the baffle wall 770 and the return port 774. The second baffle wall 780 extends down to an extent that is below the upper terminal edge of the baffle wall 770 (e.g., at least 5 mm below, or at least 8 mm below). In other words, lubricant passing from the return port 774 to the pump intake 355 must pass below the second baffle wall 780 and change directions, vertically upward, in order to pass the baffle wall 770. The baffle wall 770 and the second baffle wall 780 are also placed in relatively close proximity to each other so that lubricant flow velocity is accelerated on the passage between the walls 770, 780. A minimum gap between the walls 770, 780 can be less than 12 mm, or less than 9 mm. Particles entrained with the lubricant have a higher mass and are carried by momentum into the baffle wall 770 rather than freely up and over toward the pump intake 355. From there, these particles fall by gravity to the bottom of the baffle wall 770 on the side proximate the return port 774 and opposite the pump intake 355, thus forming a particle collection zone 784.

Although the invention has been described in detail with reference to certain preferred embodiments, variations and modifications exist within the scope and spirit of one or more independent aspects of the invention as described.

Various features of the invention are set forth in the following claims.

What is claimed is:

1. A portable pipe threader comprising:
   a housing;
   a carriage supported by the housing;
   at least one pipe threading tool coupled to the carriage and selectively operable to perform work on a pipe;
   a drive assembly at least partially positioned within the housing, the drive assembly including an electric motor operable to provide torque to rotate the pipe; and
   a lubrication system including:
      a catch basin provided on one side of the housing,
      a reservoir for holding a lubricant,
      a debris shield positioned to shield the reservoir from debris formed during the work on the pipe,
      a drip catch having one or more pockets that open toward the debris shield, and
      a pump powered by the drive assembly to establish a flow of lubricant from the reservoir; and
   a stand adjustable between a collapsed state and a deployed state,
   wherein, with the stand in the collapsed state, the portable pipe threader can be put in a vertically stowed configuration in which a longitudinal axis of the housing is substantially vertical with respect to a floor or ground surface, and
   wherein, in the vertically stowed configuration, the debris shield is oriented substantially vertically above the drip catch so that the one or more pockets of the drip catch can catch and retain lubricant dripped from a proximal edge of the debris shield.

2. The portable pipe threader of claim 1, further comprising:
   a battery pack configured to provide electrical power to the motor and/or to the lubrication system.

3. The portable pipe threader of claim 1, wherein the electric motor is a brushless direct current electric motor.

4. The portable pipe threader of claim 1, wherein the drip catch includes a reduced-width portion that accommodates an intake of the pump.

5. The portable pipe threader of claim 1, wherein the one or more pockets are a plurality of pockets in the drip catch.

6. The portable pipe threader of claim 1, wherein the drip catch is engaged with the debris shield to retain the debris shield with respect to the catch basin in the vertically stowed configuration.

7. The portable pipe threader of claim 1, wherein the drip catch is coupled to the catch basin with a plurality of fasteners that pass through a mounting portion of the drip catch.

8. The portable pipe threader of claim 7, wherein a retainer tab of the drip catch extends from the mounting portion to extend over the proximal edge of the debris shield such that the proximal edge is sandwiched between one or more ledges of the catch basin and the retainer tab.

9. The portable pipe threader of claim 8, wherein the retainer tab is provided centrally along the drip catch.

10. The portable pipe threader of claim 1,
    wherein the at least one pipe threading tool is a die holder having a particular die,
    wherein the work performed on the pipe by the at least one pipe threading tool comprises cutting threads into the pipe while the pipe is rotated by a spindle, and
    wherein the torque from the electric motor is transferred to the spindle.

11. The portable pipe threader of claim 10, further comprising:
    a pipe cutter to trim excess pipe; and
    a pipe reamer to deburr an inner edge of a cut end of the pipe.

12. A portable pipe threader comprising:
    a housing;
    a carriage supported by the housing;
    at least one pipe threading tool coupled to the carriage and selectively operable to perform work on a pipe;
    a drive assembly at least partially positioned within the housing, the drive assembly including an electric motor operable to provide torque to rotate the pipe; and
    a lubrication system including:
       a catch basin provided on one side of the housing,
       a reservoir for holding a lubricant,
       a return port provided in the catch basin for passing lubricant into the reservoir, and
       a pump powered by the drive assembly to establish a flow of lubricant from the reservoir, and the pump having an intake,
    wherein a first baffle wall extends upwardly from a bottom wall of the reservoir, and a second baffle wall extends vertically downward from a bottom side of the catch basin and the second baffle wall is disposed at a position between the first baffle wall and the return port, and
    wherein the first and second baffle walls overlap vertically such that lubricant passing from the return port to the intake of the pump must pass below the second baffle wall and change directions so as to flow vertically upward along the first baffle wall in order to pass over the first baffle wall, thereby forming a particle collection zone at a bottom of the first baffle wall.

13. The portable pipe threader of claim 12, wherein the lubrication system includes:
 a debris shield positioned over the catch basin to prevent ingress of debris formed during the work on the pipe into the reservoir,
 a drip catch having one or more pockets that open toward the debris shield, and
 a stand adjustable between a collapsed state and a deployed state,
 wherein, with the stand in the collapsed state, the portable pipe threader can be put in a vertically stowed configuration in which a longitudinal axis of the housing is substantially vertical with respect to a floor or ground surface, and
 wherein, in the vertically stowed configuration, the debris shield is oriented substantially vertically above the drip catch so that the one or more pockets of the drip catch can catch and retain lubricant dripped from a proximal edge of the debris shield.

14. The portable pipe threader of claim 13, wherein the drip catch is engaged with the debris shield to retain the debris shield with respect to the catch basin in the vertically stowed configuration.

15. The portable pipe threader of claim 13, wherein the drip catch is coupled to the catch basin with a plurality of fasteners that pass through a mounting portion of the drip catch.

16. The portable pipe threader of claim 12,
 wherein the at least one pipe threading tool is a die holder having a particular die,
 wherein the work performed on the pipe by the at least one pipe threading tool comprises cutting threads into the pipe while the pipe is rotated by a spindle, and
 wherein the torque from the electric motor is transferred to the spindle.

17. The portable pipe threader of claim 16, further comprising:
 a pipe cutter to trim excess pipe; and
 a pipe reamer to deburr an inner edge of a cut end of the pipe.

* * * * *